Sept. 3, 1963     W. C. KERR     3,102,746
DOWEL PIN
Filed Nov. 18, 1960

*INVENTOR.*
WALTER C. KERR
*BY*
WILSON, SETTLE, McRAE & CRAIG
ATTORNEYS

United States Patent Office 3,102,746
Patented Sept. 3, 1963

3,102,746
DOWEL PIN
Walter C. Kerr, 924 Oakwood, Dearborn, Mich.
Filed Nov. 18, 1960, Ser. No. 70,241
7 Claims. (Cl. 287—127)

This invention relates to a dowel pin construction, and more particularly to a dowel pin which functions to prevent relative shifting of two parts which are secured together.

In metal working, it is frequently desirable to secure two parts together in such a manner as to prevent even minute shifting of one part relative to the other. For example, in the making of dies and fixtures, mating parts may be secured together and machined. Relative shifting of the parts during such machining must be prevented in order to maintain the parts within specified tolerances. Conventionally, the parts are first secured to each other by the use of clamps or screws. Registering circular openings are then provided in the parts and a cylindrical dowel pin is driven into and through each set of openings, a portion of the dowel pin extending into each part. The dowel pin functions to prevent shifting of the parts relative to one another.

This method of doweling has proved unsatisfactory in some instances. For example, it is frequently necessary to drill the dowel pin holes after the two parts have been mounted in a fixture. If the doweled parts are part of a large structure, such as an automotive body fixture, portable drilling equipment must be used and it is frequently difficult to accurately drill the holes. In addition, due to the limited working space available, the provision of the holes is time consuming and expensive (the service of highly skilled workmen such as tool and die makers being necessary).

The dowel pin of the present invention permits forming of the dowel holes prior to assembly of the parts. As will be appreciated, this results in a significant amount of time saved, and additionally, in some cases, improved accuracy.

It is an object of the present invention to provide a dowel pin construction for holding two parts from relative shifting.

Another object of the invention is to provide such a dowel pin which necessitates the provision of an opening in only one of the parts, and wherein the opening may be formed prior to assembly of the parts.

A further object of the invention is to provide a dowel pin having a sleeve structure with an extendable prong structure which is insertable into a metal part for engagement therewith.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
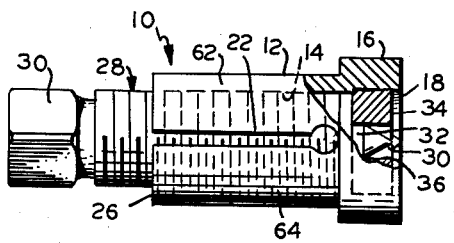
FIGURE 1 is a side elevational view of one embodiment of the dowel pin of the present invention with parts broken away for the purpose of clarity.
Figure 2:
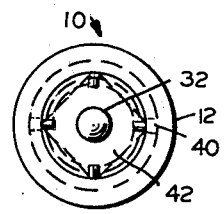
FIGURE 2 is a bottom plan view of the dowel pin of FIGURE 1.
Figure 3:
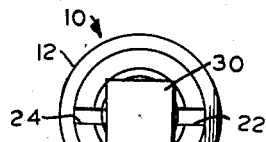
FIGURE 3 is a top plan view of the dowel pin of FIGURE 1.

As may be seen by reference to FIGURE 1, the dowel pin 10 includes a sleeve 12 comprising an elongated body having an opening 14 therethrough. An enlarged head 16 is provided at one end of the sleeve, the opening 14 being enlarged at this point to form a recess 18. The sleeve is internally threaded, the threads extending from end 26 up to the recess 18. The sleeve has a pair of diametrically opposed slits 22, 24 which also extend from end 26 up to head 16. The slits define opposed compressible walls 62, 64.

Figure 4:
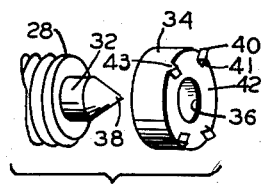
FIGURE 4 is an exploded view of the prong structure of the dowel pin of FIGURE 1.

Threadingly engaged in the sleeve is externally threaded member 28. Member 28 is provided with a wrench engageable head 30 at one end and a pointed prong element 32 at the other end. The prong 32 extends into the recess 18. Received in the recess is a circular sliding element 34. The sliding element 34 has an opening 36 therethrough to receive the prong 32 with the tip 38 projectable therebeyond. As will be noted in FIGURE 4, the element 34 is provided with a plurality of relatively small pointed prongs 40 arranged around the outer periphery of face 42. The prongs 40 are wedge shaped and have relatively flat faces 41, 43. The faces 41, 43 are substantially parallel to the longitudinal axis of the pin structure 10. When the prongs 40 are driven into a metal element, as will be described hereinafter, the faces 41, 43 will resist moving out of engagement with the metal element when forces perpendicular to the dowel pin axis are applied to the structure. If the prongs 40 were conical, the tendency would be to move up the sloping surface formed by the prongs in the metal element upon the application of such perpendicular forces.

Figure 5:
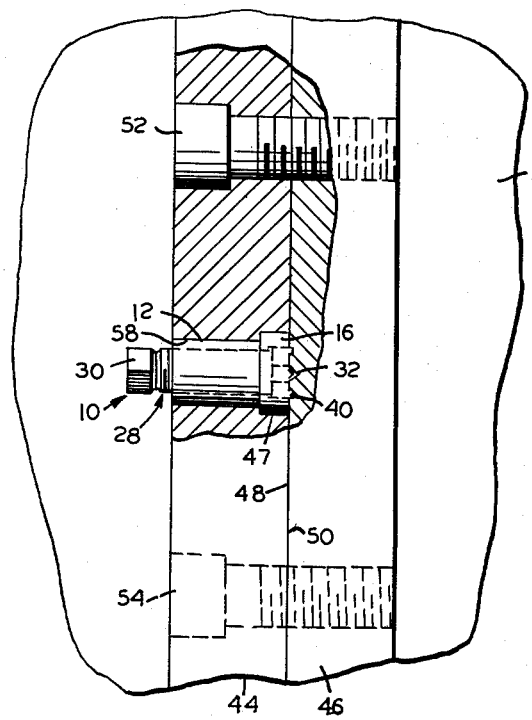
FIGURE 5 is a view of two parts in which the dowel pin of FIGURE 1 is utilized, the parts being clamped together and positioned in a fixture.

Use of the pin 10 is illustrated in FIGURE 5. As there shown, two members 44, 46 having flat faces 48, 50 are secured together by means of screws 52, 54 with the flat faces 48, 50 in facial contact. This assembly is held in place by means of a fixture 56. One of the members 44 is provided with an opening 58 therethrough. The opening 58 is formed prior to the assembly of the parts. The opening is counterbored adjacent the member 46 to form a recess 47 for the reception of the head 16 of the dowel pin. The dowel pin 10 is inserted into the opening 58 before the members 44, 46 are secured together.

The opening 58 is of smaller diameter than the normal diameter of sleeve 12. When the sleeve is driven through the opening, the walls 62, 64 are compressed towards each other with a consequent reduction of the internal sleeve diameter. This provides a firm engagement between opening 58 and the sleeve and also a firm engagement of the threaded member 28 with the threads of the sleeve. The net result is that there is a close fit between these three parts, which prevents sidewise movement between the dowel pin and the member 44. This is advantageous in that the manufacturing tolerances, particularly of the threads, do not have to be held to an extreme degree of accuracy in order to maintain a tight fit. A significant manufacturing cost saving is obtained by this construction.

After the parts have been assembled together, the head 30 of threaded member 28 is turned by means of a wrench to thread the member 28 towards the doweled member 46. The member 28 will drive the prongs 40 of sliding member 34 and the prong 32 into the doweled member 46 to thus engage this member and prevent its shifting relative to member 44. Normally, the prongs will be driven their full length into member 46. However, if it is desired to disassemble members 44, 46 and to then reassemble them in the same position, the prongs may be driven only partially into the member 46. When the parts are taken apart and then reassembled, the prongs may then be driven entirely into member 46. This permits a firm engagement upon the reassembling of the members 44, 46.

Figure 6:
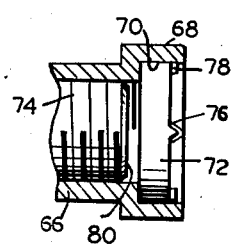
FIGURE 6 is a sectional view of a second embodiment of the dowel pin in which the prong structure is modified.

A modified form of the invention is shown in FIGURE 6. As will be noted, the sleeve 66 is provided with an enlarged head 68 having a recess 70 as in the FIGURE 1 embodiment. Sliding member 72 is received in recess 70. However, there is no prong provided on the end of the threaded member 74. Instead, an enlarged prong 76 is provided centrally of the sliding member 72. The sliding member 72 is also provided with peripheral prongs 78 as in the FIGURE 1 embodiment.

In operation, the inner end 80 of the threaded member abuts against the sliding member 72 to drive this member into engagement with the dowel member.

When two parts have been doweled together by use of the dowel pin of the present invention, they may be handled and machined without danger of significant relative shifting. There will always be, of course, a small amount of shift. However, with the present invention such shifting can be kept approximately within close manufacturing tolerances. The invention is particularly useful in connection with the manufacture of, for example, automotive body fixtures, machining fixtures, testing fixtures, and automation machinery structures.

Having thus described my invention, I claim:

1. A dowel pin construction comprising an internally threaded sleeve; an enlarged portion at one end thereof; a recess in the enlarged portion; an externally threaded member threadingly engaged in said sleeve; a pointed element carried on one end of the externally threaded member and extending into the recess; and a sliding element in said recess; said sliding element having an opening therethrough to receive said pointed element with the tip of the pointed element projecting therebeyond, and a plurality of prongs on the sliding element extending outwardly from the recess.

2. In a dowel pin, the combination comprising a body having an opening therethrough, an enlarged head at one end of the body, means including a prong structure received in the opening at the end of the body having an enlarged head, said body opening being internally threaded adjacent to the enlarged head, and an externally threaded member threadingly engaged in said sleeve to drive the prong structure out of the body.

3. A device as in claim 2 and further characterized in that the prong structure means comprise a sliding element in said recess; and a plurality of prongs on the sliding element extending outwardly from the recess; said externally threaded member abutting against the sliding element for driving the sliding element and prongs out of the opening.

4. In a dowel pin construction, the combination comprising an internally threaded sleeve for insertion into an opening; the sleeve being slit longitudinally to permit insertion thereof into an opening of smaller size than the sleeve with a consequent reduction of the internal sleeve diameter; an enlarged portion at one end of the sleeve; a recess in the enlarged portion; means including a prong structure received in the recess, and an externally threaded member threadingly engaged in said sleeve to drive the prong structure out of the recess.

5. A dowel pin construction comprising a body having an opening therethrough; a portion of said opening being threaded; the opening being enlarged adjacent the threaded portion to form a recess; a threaded member in threading engagement with the threaded portion of the opening; a pointed element carried on one end of the threaded member and extending into the recess; and a sliding element in said recess; said sliding element having an opening therethrough to receive said pointed element with the tip of the pointed element projecting therebeyond.

6. The combination comprising first and second doweled members each having a mating face with respect to the other and secured together with the mating faces in facial contact; a first one of said members having an opening therethrough; said opening being enlarged adjacent the second doweled member; a dowel pin in said opening; said dowel pin comprising an internally threaded sleeve received in said opening and having an enlarged portion at one end thereof received in the enlarged portion of said opening; a recess in the enlarged portion of the sleeve; means including a prong structure received in the recess, and an externally threaded member threadingly engaged in said sleeve to drive the prong structure out of the recess into engagement with said second doweled member.

7. The combination of claim 6 and further characterized in that the opening in the first doweled member is smaller than the normal diameter of the dowel pin sleeve; the sleeve being slit longitudinally to permit insertion thereof into the doweled member opening with a consequent reduction of the internal sleeve diameter whereby to provide a firm engagement between the doweled member opening and the sleeve and between the sleeve and said threaded member.

References Cited in the file of this patent

UNITED STATES PATENTS

| | | |
|---|---|---|
| 750,211 | Miner | Jan. 19, 1904 |
| 913,575 | Sprague | Feb. 23, 1909 |
| 945,863 | Paugh | Jan. 11, 1910 |
| 1,438,648 | Jacobs | Dec. 12, 1922 |
| 2,901,787 | Whistler et al. | Sept. 1, 1959 |